United States Patent
Panigrahi

(10) Patent No.: US 10,782,711 B2
(45) Date of Patent: Sep. 22, 2020

(54) SYSTEM AND METHOD FOR ROUND ROBIN PRODUCT BLENDING

(71) Applicant: Honeywell International Inc., Morris Plains, NJ (US)

(72) Inventor: Chitta Ranjan Panigrahi, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 102 days.

(21) Appl. No.: 16/040,803

(22) Filed: Jul. 20, 2018

(65) Prior Publication Data

US 2019/0121373 A1  Apr. 25, 2019

Related U.S. Application Data

(60) Provisional application No. 62/575,971, filed on Oct. 23, 2017.

(51) Int. Cl.
*G05D 11/13* (2006.01)
*G05B 15/02* (2006.01)

(52) U.S. Cl.
CPC .......... *G05D 11/132* (2013.01); *G05B 15/02* (2013.01); *G05D 11/133* (2013.01)

(58) Field of Classification Search
CPC .. G05D 11/131; G05D 11/132; G05D 11/133; Y10T 137/0329; Y10T 137/87652
See application file for complete search history.

(56) References Cited

U.S. PATENT DOCUMENTS

| | | | | |
|---|---|---|---|---|
| 3,776,252 | A * | 12/1973 | Wilcox | F04B 13/02 137/99 |
| 5,083,872 | A * | 1/1992 | Farling | B01F 15/0462 137/565.33 |
| 6,224,250 | B1 * | 5/2001 | Kreinheder | B28C 7/02 360/16 |
| 6,540,797 | B1 † | 4/2003 | Scott | |
| 8,052,322 | B2 * | 11/2011 | Ballu | G05D 11/133 366/162.3 |
| H2267 | H | 3/2012 | Nelson, Jr. | |
| 8,506,656 | B1 † | 8/2013 | Turocy | |
| 8,968,427 | B2 | 3/2015 | Eggenstein et al. | |

(Continued)

FOREIGN PATENT DOCUMENTS

WO  2007124058 A2  11/2007

*Primary Examiner* — Mark A Connolly

(57) ABSTRACT

A method, an electronic device, and a computer readable medium for fuel blending are disclosed. The method includes deriving a volume of each product from at least two products that is transferred from separate source containers to fill a destination container. The method also includes transferring a portion of the derived volume of each of the products sequentially into the destination container, wherein each product is transferred one at a time. The method further includes repeating the transfer of the portion of each of the products for a plurality of cycles until the derived volume of each of the products is transferred into the destination container. Each product of at least two products is transferred individually and sequentially during each of the cycles. The portion of the derived volume is based on the plurality of cycles.

20 Claims, 4 Drawing Sheets

(56) References Cited

U.S. PATENT DOCUMENTS

| | | | |
|---|---|---|---|
| 2002/0020714 A1* | 2/2002 | Pozniak | B01F 13/1055 |
| | | | 222/129 |
| 2005/0058016 A1 | 3/2005 | Smith et al. | |
| 2006/0051285 A1* | 3/2006 | Hawker | A61L 2/18 |
| | | | 423/477 |
| 2014/0251448 A1* | 9/2014 | Witt | G05D 11/133 |
| | | | 137/88 |

\* cited by examiner
† cited by third party

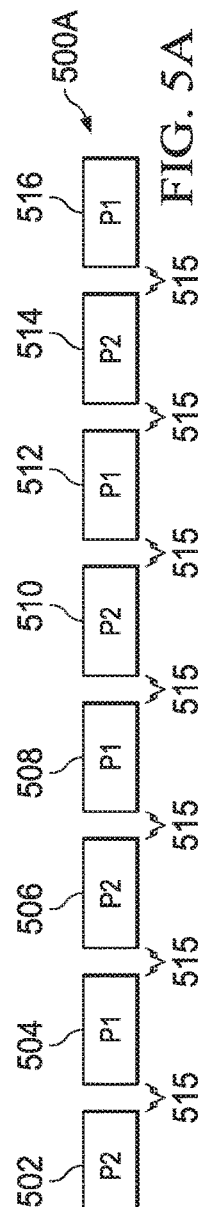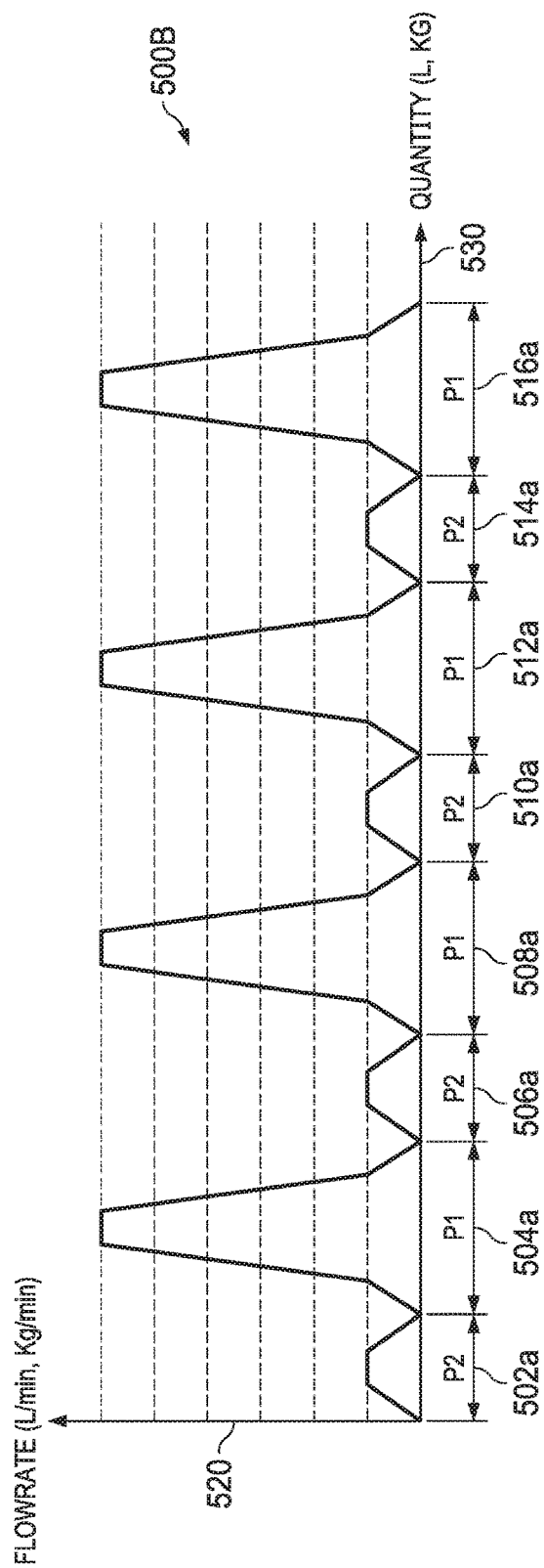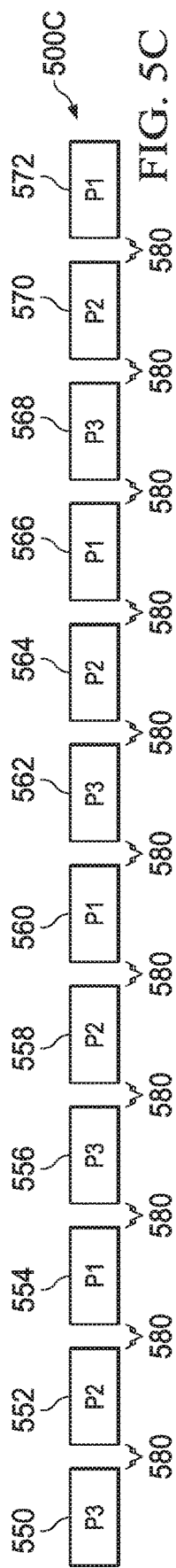

SYSTEM AND METHOD FOR ROUND ROBIN PRODUCT BLENDING

CROSS-REFERENCE TO RELATED APPLICATION AND CLAIM OF PRIORITY

This application claims priority under 35 U.S.C. § 119(e) to U.S. Provisional Patent Application No. 62/575,971 filed on Oct. 23, 2017. The above-identified provisional patent application is hereby incorporated by reference in its entirety.

TECHNICAL FIELD

This disclosure relates generally to industrial process control and automation systems. More specifically, this disclosure relates to an apparatus and method for round robin blending of products for storage or transport.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators. In some portions of an industrial process, a plurality of products may be combined into one storage container. Sensors and actuators may be used to control this process.

Petroleum products such as gasoline and diesel utilize extensive distribution systems to transport the products from one or more refineries to a consumer. For example, a pipeline can transfer products from refineries to various tank farms. At the tank farms, the products are stored until the products are dispensed to a tanker truck. The tanker truck then delivers the products to retail gasoline stations and other dispensing outlets where the gasoline is eventually delivered to an automobile, truck, or other vehicle.

During the distribution process, one or more products can be blended into the fuel for different purposes. For example, products or different fuels can be blended or mixed to create different octane levels. Similarly blending in different products can limit emissions when the product is used, as well as increase the consumption of biofuels, ethanol, and the like.

Blending two or more products together in a large scale operation such as petroleum distribution is often difficult and expensive. For example, a large space or facility is necessary for the storage of each product and the newly blended product. When blending multiple products significant costs are incurred due to the industrial equipment required to manage and maintain proper quantities of each constituent product. Also, mixing the various products together to form a homogeneous mixture often requires agitation of the products, or sophisticated blending systems, or a combination thereof, both of which can be time consuming and expensive.

SUMMARY

This disclosure provides an apparatus and method for round robin product blending.

In a first embodiment, a method is provided. The method includes deriving a volume of each product from at least two products that is transferred from separate source containers to fill a destination container. The method also includes transferring a portion of the derived volume of each of the products sequentially into the destination container, wherein each product is transferred one at a time. The method further includes repeating the transfer of the portion of each of the products for a plurality of cycles until the derived volume of each of the products is transferred into the destination container. Each product of at least two products is transferred individually and sequentially during each of the cycles. The portion of the derived volume is based on the plurality of cycles.

In a second embodiment, an electronic device is provided. The electronic device includes a set of industrial equipment, an interface and processor operably connected to the interface and the set of industrial equipment. The set of industrial equipment is operably able to transfer at least two products from separate source containers to fill a destination container. The processor is operably connected to the interface and the set of industrial equipment. The processor is configured to derive a volume of each product from the at least two products that is transferred from the separate source containers to fill the destination container. The processor is also configured to instruct the set of industrial equipment to transfer a portion of the derived volume of each of the products sequentially into the destination container, wherein each product is transferred one at a time. The processor is further configured to instruct the set of industrial equipment to repeat the transfer of the portion of each of the products for a plurality of cycles until the derived volume of each of the products is transferred into the destination container. Each product of at least two products is transferred individually and sequentially during each of the cycles. The portion of the derived volume is based on the plurality of cycles.

In a third embodiment, a non-transitory computer readable medium is provided. The non-transitory computer readable medium embodies a computer program, the computer program comprising computer readable program code that when executed by a processor of an electronic device causes the processor to: derive a volume of each product from at least two products that is transferred from separate source containers to fill a destination container; transfer a portion of the derived volume of each of the products sequentially into the destination container, wherein each product is transferred one at a time; and repeat the transfer of the portion of each of the products for a plurality of cycles until the derived volume of each of the products is transferred into the destination container, wherein each product of at least two products is transferred individually and sequentially during each of the cycles, and wherein the portion of the derived volume is based on the plurality of cycles.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 5A and 5B illustrate an example of two products blending in accordance with embodiments of the present disclosure;

FIG. 5C illustrates an example of three products blending in accordance with embodiments of the present disclosure.

DETAILED DESCRIPTION

Figure 1:
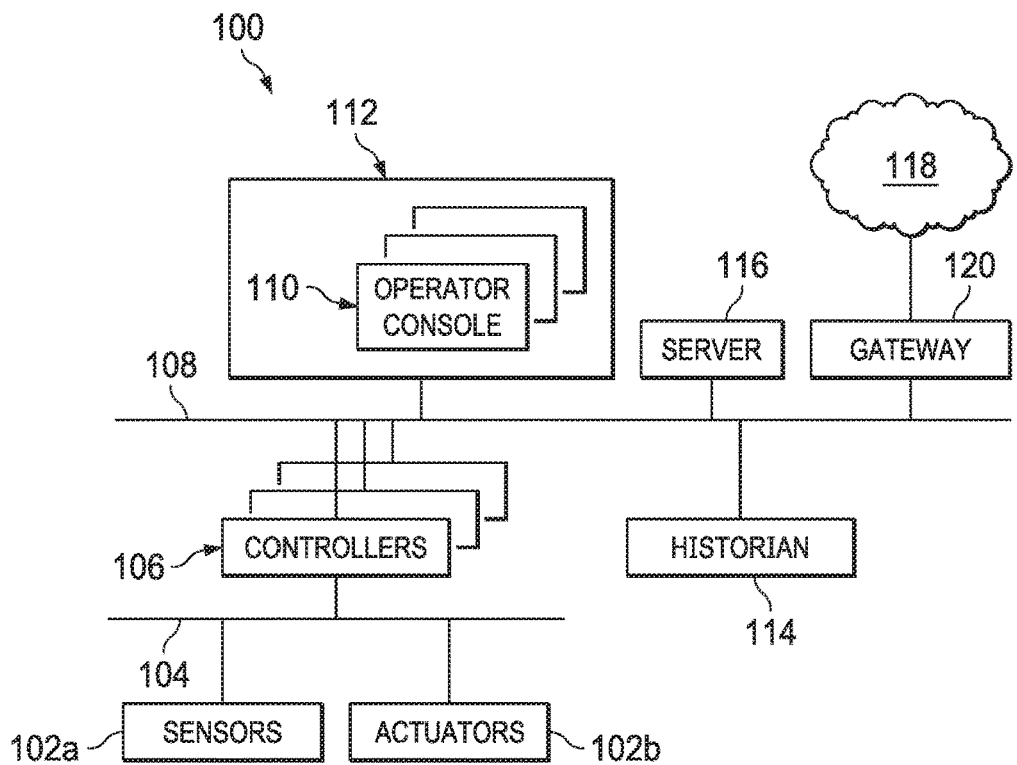
FIG. 1 illustrates an example industrial process control and automation system in accordance with embodiments of the present disclosure.

FIGS. 1 through 6, discussed below, and the various embodiments used to describe the principles of the present invention in this patent document are by way of illustration only and should not be construed in any way to limit the scope of the disclosure. Those skilled in the art will understand that the principles of the invention may be implemented in any type of suitably arranged device or system.

Embodiments of the present disclosure recognize and take into consideration that, due to the rise in popularity and in certain cases a legislated requirement, various products, alternative fuels, ethanol, biodiesel, and the like, are being added to a fuel product by a refinery. Adding the various products to a fuel source is driving a number of fuel distribution facilities to incorporate a method to blend the fuels together. In addition to the numerous products that can be added together to a fuel source, even more ratios of each product can be added to the main product to create countless varieties of blended fuel. Each of the varieties of blended fuel can be specified or customized based on the needs or location of the consumer.

Embodiments of the present disclosure further recognize and take into consideration that various blending techniques include ratio blending, side stream blending, and sequential blending. Each of the various blending techniques have significant shortcomings, such as an inability to achieve certain ratios of blended products and requiring additional industrial equipment such as valves, pumps, sensors, flow meters, and the like that increase the required overhead and cost of a blending facility. Due to the volatile nature of petroleum based products, accurate measurement for blending while maintaining a competitive and inexpensive approach is necessary.

For example, ratio blending is a blending technique whereby two or more products are measured individually by a dedicated meter and then combined prior to delivery into the recipient vessel. Side stream blending is a blending process whereby one or more products are metered into a line containing the primary product, and resulting blend is then measured as a blend by another meter. Both ratio blending and side stream blending require dedicated flow meters, control valves, and sensors for each product, and each piping configuration, such as the size of the pipes, is configured for a specific blending ratio. Sequential blending is a process whereby a single trade meter is used to measure two or more products, where each product is measured individually, in sequence, and blending takes place in the recipient vessel.

Therefore, embodiments of the present disclosure provide systems and methods for a round robin product blending approach where each product is added individually, one at a time, and in a sequential order. In particular, embodiments of the present disclosure provide systems and methods for blending two or more products together in a round robin fashion. Round robin blending blends two or more products together, where each product is added to the destination container individually in a sequential order in two or more cycles. The round robin blending allows for multiple cycles of the transfer of product from the various source containers to the destination container. In certain embodiments, the main product is delivered last, and the one or more blended products are delivered prior to the main product. That is, during each cycle of the round robin blending, a portion of each component product is transferred individually to the destination container, and then the main product is transferred to the destination container. This process repeats until a batch load is achieved. In certain embodiments, a single cycle is utilized to transfer products from a source container to a destination container, such that the entire quantity of each product is transferred from each respective source container to a destination container.

Blending two or more products together for a large scale operation such as petroleum distribution is based on combining large quantities of each constituent product. In certain embodiments, blending two or more products together utilizes a transfer process that includes storage containers, piping, pumps, a control valve, a flow meter, and various other instruments and control processes. Each constituent product is stored in a separate storage container and moved to another storage container, referred to as a destination container, based on the weight or volume of each product. In certain embodiments, during the blending process, the two or more products are measured individually by a single flow meter and controlled by a single control valve when each product is loaded individually into the destination container.

A blending cycle is complete when a portion or ratio of each of the products is delivered once to the destination container. A batch is complete when the preset volume of the products is delivered to destination container. A batch includes one or more blending cycles. When the number of cycles increases for a single batch, the amount of each product transferred during a single cycle decreases. As the number of cycles increases, the products can be blended better to form a more homogeneous mixture. In certain embodiments, a batch can include a single cycle where the entire product to be blended is delivered at a single time. For example, a batch is complete when the destination container is full. In another example, a batch is complete when a preset total volume of the blended product is delivered to the destination container over one or more cycles. Each cycle can include a percentage of the total volume delivered to the destination container, such that the same or similar volume of each product is delivered during each cycle.

In certain embodiments, the destination container includes multiple compartments. For example, a tanker truck that transports fuel from a distribution facility (such as a tank farm) to the consumers (such as a retail gasoline station) can include multiple compartments each containing different varieties of a blended fuel product. In another example, the destination container is a large container that includes multiple compartments for storing different varieties of a blended fuel product. A batch is complete when a single compartment of a destination container is filled. A transaction is complete when each compartment of the destination container is filled. When producing a single batch, the blend ratio does not change. Since a transaction can include multiple batches, each individual batch of a transaction can have a unique blend ratio.

FIG. 1 illustrates an example industrial process control and automation system 100 according to embodiments of the present disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, temperature, or density. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

In certain embodiments, sensors 102a and actuator 102b are connected to network 104. Network 104 generally represents any suitable communication network(s). The network 104 could represent any suitable network or combination of networks. In certain embodiments, network 104 is an internal network that provides feedback of the sensor 102a and actuator 102b to owners/operators of the system 100. In certain embodiments, network 104 is an external network, outside the control of owners/operators of the system 100, but provides feedback of the sensor 102a and actuator 102b to a third party network.

At least one network 104 is coupled to the sensors 102a and actuators 102b. The network 104 facilitates interaction, for example of controllers 106, described below, with the sensors 102a and actuators 102b. For example, the network 104 could transport measurement data from the sensors 102a to controllers 106 and provide control signals from controllers 106 to the actuators 102b. As particular examples, the network 104 could represent at least one network (such as one supporting a FOUNDATION FIELDBUS protocol), electrical signal network (such as a HART network), pneumatic control signal network, direct 4-20 mA analog inputs and flow pulse inputs or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. For example, a controller 106 could receive measurement data from one or more sensors 102a and use the measurement data to generate control signals for one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network or an RS485/RS422 communication network. In certain embodiments, network 108 is similar or the same network as network 104.

Operator access to and interaction with the controllers 106 and other components of the system 100 can occur via one or more operator consoles such as operator console 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could request information affecting how the industrial process is controlled, such as by requesting set points or control modes for process variables controlled by the controllers 106 or other information that alters or affects how the controllers 106 control the industrial process. This could include requesting this information from the controllers 106 or from other devices such as historian 114 or servers 116. In response to such requests, each operator console 110 could receive the requested information. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 depicted here also includes at least one historian 114 and one or more servers, such as server 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator console 110 or other applications. The applications could be used to support various functions for the operator console 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

In certain embodiments, the system 100 may optionally include one or more mobile devices (not shown), such as a mobile "smart" device. Each mobile device could be used to obtain information about one or more industrial processes or the system 100 and display the information to users. Each mobile device could also be used to obtain input from the users altering how the industrial processes are controlled by the system 100. A mobile device could be used in any other suitable manner in or with the system 100. Any suitable type(s) of mobile devices could be used in or with the system 100, such as smartphones, tablet computers, or laptop computers.

At least one component of the system 100 could support a mechanism for round robin blending of products. For example, this functionality could be implemented in an operator console 110, a server 116, or a computing cloud 118 or remote server. In accordance with this disclosure, one or more other process variable measurements can be correlated such as the flow of the product via a flow meter, a variety of sensors such as a temperature sensor, a pressure sensor, a density sensor, as well as various control valves to control to transfer of multiple products from separate source containers to a destination container. For example, a single flow meter and a single control valve coupled with a set of sensors can indicate the volume of each product being transferred to a destination container. An operator console, such as an operator console 110, can receive an input, such as a batch load size and a blend ratio of each product along with a number of cycles, and automatically control the transfer of each product from the source container into the destination container.

Although FIG. 1 illustrates one example of an industrial process control and automation system 100, various changes may be made to FIG. 1. For example, the system 100 could include any number of sensors, actuators, servers, operator stations, operator consoles, control rooms, controllers, networks, historians, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where round robin blending of products is possible. This functionality can be used in any other suitable system, and that system need not be used for industrial process control and automation.

Industrial processes are typically implemented using large numbers of devices, such as pumps, valves, compressors, or other industrial equipment. Similarly, industrial process control and automation systems are typically implemented using large numbers of devices, such as the sensors 102a, actuators 102b, controllers 106, and other components in FIG. 1.

Various networks can be used to couple these devices together and transport information.

Figure 2:
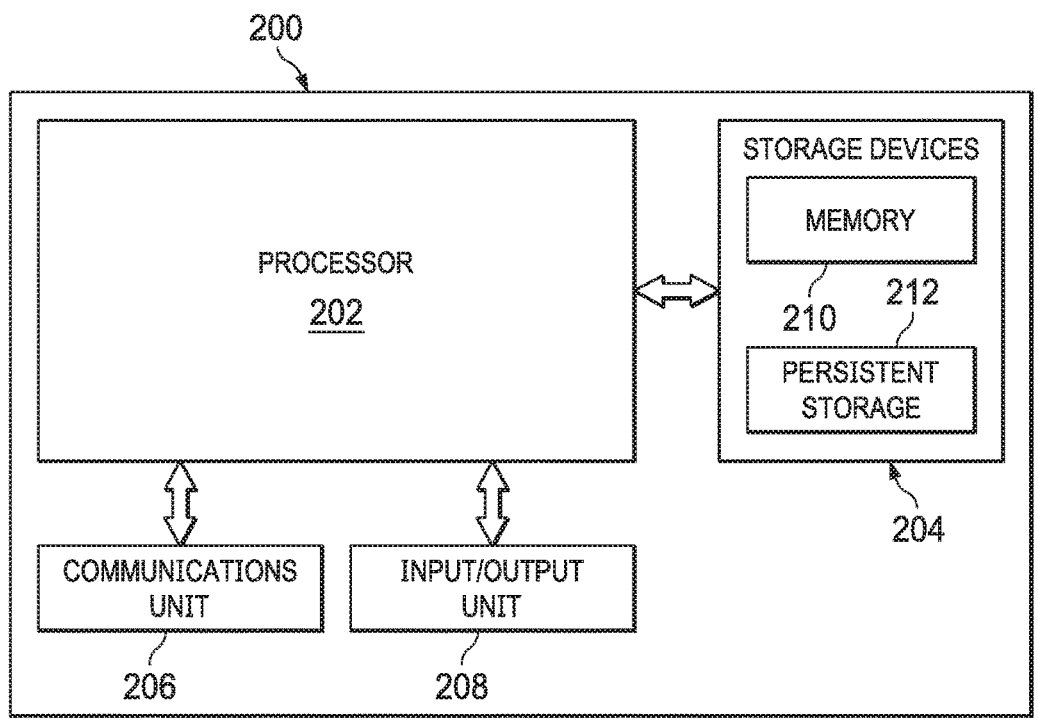
FIG. 2 illustrates an example computing device for fuel blending in accordance with embodiments of the present disclosure.

FIG. 2 illustrates an example computing device 200 for supporting round robin blending of products according to this disclosure. In some embodiments, the computing device 200 could denote an operator console 110, server 116, or device used in the computing cloud 118 as described above with respect to FIG. 1. However, the computing device 200 could be used in any other suitable system. The computing device 200 could be used to run applications. The computing device 200 could be used to perform one or more functions, such as receiving an input for the distribution of a particular component product. For ease of explanation, the computing device 200 is described as being used in the system 100 of FIG. 1, although the device could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. The instructions could conduct round robin blending of a plurality of products. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keypad, touchscreen, or other suitable input device. The I/O unit 208 may also send output to a display, printer, or other suitable output device.

Although FIG. 2 illustrates one example of a computing device 200 for round robin product blending, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
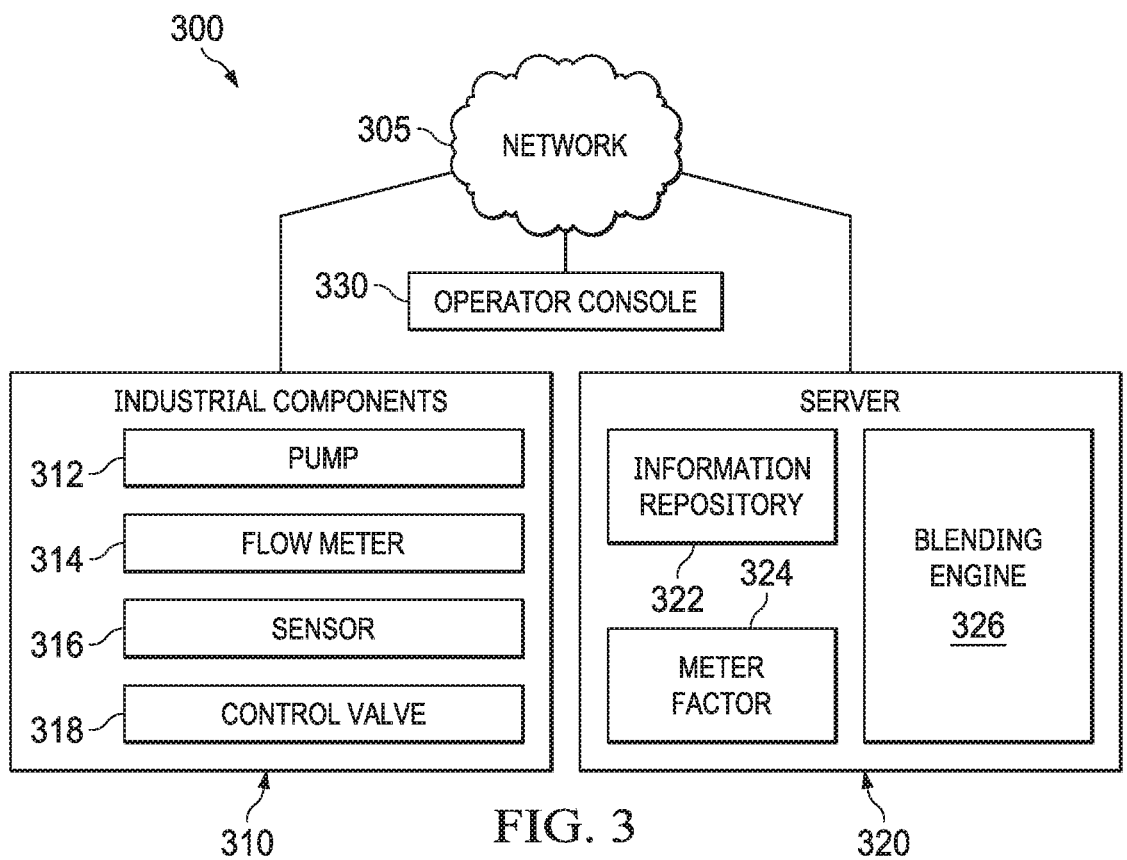
FIG. 3 illustrates an example block diagram of a communication system in accordance with embodiments of the present disclosure.

FIG. 3 illustrates an example block diagram 300 of a communication system in accordance with embodiments of the present disclosure. FIG. 3 illustrates a high-level architecture, in accordance with an embodiment of this disclosure. The embodiment of the block diagram 300 shown in FIG. 3 is for illustration only. Other embodiments can be used without departing from the scope of the present disclosure. Block diagram 300 includes various industrial components 310, a server 320, and an operator console 330 communicating via a network 305.

In certain embodiments, the network 305 includes a larger networking environment. For example, the network 305 can be used for communication between the industrial components 310 and the server 320 as well as communication between the server 320 and the operator console 330 or computing device, similar to the operator console 110 of FIG. 1. In another example, the network 305 can be used for communication between the industrial components 310 and the operator console 330. The network 305 is also able to provide a communication medium between the industrial components 310 and additional servers and equipment (not shown). For example, the network 305 can be connected to an information repository (i.e., a database) that contains historical data pertaining to various industrial components 310, the storage containers of the various fuel products, the destination container, or additional sensors associated with the round robin blending process.

In certain embodiments, the network 305 represents a "cloud" of computers interconnected by one or more networks, where the network 305 is a computing system utilizing clustered computers and components to act as a single pool of seamless resources when accessed. In certain embodiments, the network 305 represents a wireless network that can range is sized from Near Field Communication (NFC) to Local Area Networks (LANs) to wide area networks (WAN). In certain embodiments, the network 305 provides access to the internet or other remote networks.

As discussed above with respect to FIG. 1, the industrial components 310 include a variety of components that regulate and control the blending of products. The industrial components 310 allow products from different source containers to be transferred and blended together to create a homogeneous product in a single destination container. The industrial components 310 perform the pumping, measuring, and control the volume of each product that is transferred into the destination container. The industrial components include a pump 312, a flow meter 314, a sensor 316, and a control valve 318. Additional types of components can be included without departing from the scope of this disclosure. In certain embodiments, the various industrial components 310 can be added, omitted, combined, further subdivided, or placed in any other suitable configuration according to particular needs of the blending process.

The pump 312 can be a reciprocating pump or another type of device that causes fluids to be transferred through a pipeline. The pump 312 is any pump that is capable of transferring a quantity of product from one location to another. In certain embodiments, the product is liquid. The pump 312 is connected to a source container, such as a reservoir or other fluid containing system, and moves the fluid from the source container downstream through pipeline. The pump 312 receives a product on an intake and via pressure transfers the product to a different location. Those skilled in the art will recognize that the techniques of the present disclosure may be utilized with a wide variety of pumps. For example, the pump 312 can be a constant speed pump, a variable speed pump, a single or multi-cylinder reciprocating piston or plunger power pump, as well as possibly other types of positive displacement pumps. Those skilled in the art will also recognize that the complete structure and operation of a suitable pump, such as the pump 312 is not depicted or described herein. Instead, for simplicity and clarity, only so much of a pump system as is unique to the present disclosure or necessary for an understanding of the present disclosure is depicted and described.

The pump 312 can represent two or more pumps. A single pump is associated with each product that is transferred from a source container to a destination container. For example, a blend product requiring two separate products will utilize two pumps, with each pump transferring a respective product into the destination container. Similarly, a blend product requiring three separate products will utilize three pumps, with each pump transferring a respective product into the destination container. That is, there is a one to one correlation between each product and the number of pumps. The piping structure of the various source containers, and each pump 312 that is associated with a source container, is discussed in greater detail below, with respect to FIG. 4.

The flow meter 314 is an instrument for measuring the flow rate of a fluid, as the fluid flows through a pipe. The flow meter 314 can measure the flow of the fluid in a variety of manners. In certain embodiments, the flow meter 314 measures velocity of pressure of the fluid moving in the pipe and derives the volume of the liquid that passes the flow meter over a period of time. In certain embodiments, a positive-displacement flow meters accumulate a fixed volume of fluid and then count the number of times the volume is filled to measure flow. Other flow measurement methods rely on forces produced by the flowing stream as it overcomes a known constriction, to indirectly calculate flow. The flow meter 314 measures a general volume or weight of the flow over a period of time. The volume the flow meter 314 measures can be adjusted by a controller to account for pressure, temperature or density changes of the fluid as measured by a sensor, such as the sensor 316.

In certain embodiments, the flow meter 314 is located on a section of pipe after the flow from each source container combines into a single pipe. For example, two or more products are measured individually by the single flow meter 314 and sequentially loaded into the destination container. A detailed description of the setup is discussed below with reference to FIG. 4. For example, each product is pumped by its own pump, such as the pump 312, into a general pipe that is used to transfer all of the products. The general pipe transfers the product from each respective source container to the destination container.

The sensor 316 can include one or more sensors that can meter a physical quantity and convert metered or detected information into an electrical signal. In certain embodiments, the sensor 316 includes a pressure sensor, a temperature sensor, and a density sensor. Additional types of sensors can be included without departing from the scope of this disclosure. The sensor 316 can further include a control circuit for controlling at least one of the sensors included therein. The sensor 316 can further include a control circuit for transmitting the recorded value to the server 320, the operator console 330, or both.

In certain embodiments, each sensor 316 is located within the single pipe that transports all the products to the destination container. A detailed description of the setup is discussed below with reference to FIG. 4. The sensor 316 is located on the general pipe. That is, regardless of the number of products being transferred to create a certain blend product, only a single set of sensors is utilized.

The control valve 318 is a type of valve that controls and regulates the fluid flow by either opening or closing to either allow fluid to flow or prevent the flow of fluid through the control valve. For example, a controller, such as a blending engine 326, discussed in further detail below, can receive signals from the flow meter 314 and the sensor 316, and adjust the desired flow if the actual flow is different than a set point.

The control valve 318 can be any type of a control valve such as a single-stage control valve, a two-stage control valve, or a digital control valve, an analog control valve and the like. A single-stage control valve simply opens or closes based on a received signal. In certain embodiments, the control valve 318 adjusts the flow rate of the product.

In certain embodiments, the control valve 318 is a digital control valve. A digital control valve can adjust the rate of flow. Additionally, the process quantities such as pressure, temperature, and density as detected by various sensors (such as sensor 316), can be utilized to convert observed volume of the product to standard volume. For example an observed volume can be converted to a standard volume based on a temperature and used to control the flow rate. For example, based on the derived flow rate of the fluid via the flow meter 314, the control valve 318 can adjust its opening based on a received signal to increase or decrease the volume of the product passing through the control valve.

In certain embodiments, the control valve 318 is a digital control valve that can adjust the orifice opening allowing a higher level of control as to the amount of product that passes through the control valve 318. For example, when the control valve 318 is nearly closed, the flow meter 314 will read a slower flow due to the back pressure created by the control valve 318. In contrast, when the control valve 318 is nearly fully opened, the flow meter 314 will read a faster flow due to the decrease of the back pressure as a result of the by the control valve 318 opening.

In certain embodiments, the control valve 318 is located within the single pipe that transports all the products to the destination container. A detailed description of the setup is discussed below with reference to FIG. 4. The control valve 318 is located on the general pipe. That is, regardless of the number of products being transferred to create a certain blend product, only a single control valve is utilized.

The server 320 receives and analyzes the data transmitted from the industrial components 310. The server 320 can be similar to the server 116 of FIG. 1. The server 320 may include internal and external components as previously depicted and described in further detail with respect to FIG. 2. In certain embodiments, the server 320 represents a "cloud" of computers interconnected by one or more networks (such as network 305), where the server 320 is a computing system utilizing clustered computers and components to act as a single pool of seamless resources when accessed. The server 320 includes an information repository 322, a meter factor 324, and a blending engine 326.

The information repository 322 can be implemented using any architecture known in the art, such as a relational database, an object-oriented database, one or more tables, or a combination thereof. The information repository 322 stores data captured by the sensor 316 and the flow meter 314, as well as data that is received by the server 320 from an external device or user input. For example, the information repository 322 stores the temperature, pressure, and density of the various sensors and industrial components as the products are transferred individually to the destination container. In certain embodiments, the information repository 322 overwrites the recorded data at predetermined periods. For example, the blending engine 326 can instruct the information repository 322 to overwrite or delete received data from the sensor 316 or the flow meter 314 when (i) a new product is being transferred from the products source container to the destination container during a single cycle, (ii) after a single batch is complete, (iii) after a single transaction is complete, (iv) after a condition is satisfied, such as a lapse of a period of time, and the like. In another example, the information repository 322 can maintain the data for a predetermined period of time. In certain embodiments, the information repository 322 is external to the server 320.

The meter factor 324 is utilized to alter and adjust the reading of the flow meter to adjust to the particular product that is being transferred from a source container to the destination container. In certain embodiments, the meter factor 324 is included in the information repository 322. In certain embodiments, the meter factor 324 is a standalone component of the server 320.

The meter factor 324 retains various characteristics of each product as the product flows from its source container to the destination container. That is, the meter factor 324 is an error constant value that can be used to calculate the volume of the product. The properties of each product can change between product to product and thereby affect the readings of the flow meter 314. For example, the viscosity of one product can be different than the viscosity of another product. Due to different viscosity values of each product, the meter factor 324 adjusts the reading of the flow meter 314 to compensate for the various property differences of each product. The meter factor 324 can change the flow meter 314 reading of each product on an individual product basis. By adjusting the reading of the flow meter 314, the meter factor 324 adjusts how the blending engine 326 manipulates and controls the control valve 318.

A flow meter, such as flow meter 314, generates and transmits pulses that can be utilized to derive the volume of fluid that passes through the flow meter. The raw volume of fluid that passes through the flowmeter 314 can be derived from the number of received input pulses divided by a K factor. The K factor is utilized by the blending engine 326 to convert the number of received pulses from the flow meter 314 to the raw volume. For instance, the K factor can indicate that 1,000 pulses can present in one liter. That is, the number of received pulses divided by the K factor indicates the raw volume of fluid that passed through the flow meter 314. The meter factor 324 is utilized to alter to raw volume to an observed volume due to different viscosities of each product. In certain embodiments the meter factor 324 is a constant that can range from 0.5 to 1.5, and is different for each product. Using the meter factor, the blending engine 326 can derive the gross observed volume which is the raw volume times the meter factor 324. As a result, all of the products pass through the same flow meter 314 and the same K factor is fixed for all of the products. The meter factor 324 is generated by calibrating the flow meter 314 for each product. That is, each product that passes through the flow meter 314 has a unique meter factor 324 that is used by the blending engine 326 to adjust the derived volume. For example, the flow meter 314 transmits pulses as fluid passes through the flow meter 314. The blending engine 326 then multiples the number of pulses by the K factor to generate a raw volume. The raw volume can then be multiplied by the meter factor 324 (specific to the product that passed through the flow meter 314) to generate the gross observed volume. The gross observed volume can then be adjusted based on pressure, temperature, and density (as detected by sensor 316) of the product to derive to the standard volume. The standard volume is the adjusted volume that is used to control the control valve 318

The blending engine 326 manages the blending process of the two or more products. The blending engine 326 analyzes the individual requirements of each batch, such as each product and the ratio of each product required to create the blended product. The blending engine 326 can instruct each pump to start and stop via network 305. The blending engine 326 can receive information from the flow meter 314 and the sensor 316. In certain embodiments, the blending engine 326 can adjust the flow rate as indicated by the flow meter 314 based on the meter factor 324. In certain embodiments, the blending engine 326 receives an adjusted flow rate from the meter factor 324. The blending engine 326 can also instruct the control valve to open or close.

In certain embodiments, the blending engine 326 instructs a particular pump to start or stop the pumping of a particular product. For example, the blending engine 326 can instruct pump one to pump product one, when a portion of product one is delivered to the destination container, based in part on the reading of the flow meter 314, the blending engine 326 can instruct the next pump to pump the next product. This process continues until a portion of each product is delivered to the destination container. Once a portion of each product is delivered to the destination container, thereby completing a single cycle, the blending engine 326 starts the process again at pump one, and the process repeats until a full batch is transferred into the destination container.

In certain embodiments, the blending engine 326, based on the reading of the adjusted flow meter 314 reading (based on the meter factor 324), determines whether the control valve should be opened or closed. If the control valve 318 is a two-stage or digital control valve, the blending engine 326 determines the amount the control valve 318 is to be opened or closed, in order to increase or decrease the flow, as needed.

In certain embodiments, the blending engine 326 transmits a single signal or instruction to each pump to either start or stop pumping. For example, a single signal is transmitted to commence pumping and a single signal is transmitted to stop pumping. In certain embodiments, the blending engine 326 continually receives readings from the flow meter 314 and transmits an output signal to control the control valve 318. In certain embodiments, the blending engine 326 also receives an input from the sensor 316. For example, the sensor 316 can transmit pressure readings, temperature readings, and density readings of the product as each product flows towards the destination container. The sensor 316 can transmit a continual reading of pressure, temperature, and density. Alternatively, the sensor 316 can transmit readings of pressure, temperature, or density, or a combination thereof, when one of the readings changes. In certain embodiments, the blending engine 326 can request certain readings from the sensor 316.

The blending engine 326 manages the blending process by instructing each pump to turn on and off to individually deliver a portion of each product to the destination container. For example, the blending engine 326 can receive information such as a total volume of blended product, the various products to be blended together, a specific ratio, or percentage of each individual product that formulates the blended product. In certain embodiments, the blending engine 326 also receives information as to the number of cycles to transfer the products to the destination container. In certain embodiments, the blending engine 326 can determine the number of cycles to transfer the products to generate a homogeneous mixture of the products in the destination container. For example, based on the various properties of each product such as density, viscosity, and the like, the blending engine 326 can determine and assign the number of cycles to transfer the products to generate a homogeneous mixture of the products in the destination container.

The operator console 330 is similar to any operator console, such as operator console 110 of FIG. 1, or controller, such as controller 106 of FIG. 1, or any combination thereof. The operator console 330 may include internal and external components as previously depicted and described in further detail with respect to FIG. 2. In certain embodiments, the server 320 and the operator console 330 are the same. For example, the various components can transmits the data to operator console 330, where the operator console 330 includes the blending engine 326 that controls the blending of the various products. The operator console 330 provides can provide a notification to an individual indicating the competition of successful batch, or transaction.

In certain embodiments, the operator console 330 includes a user interface that allows an operator to input particular products to be blended, a ratio of each product that is to be blended. In certain embodiments, the user interface of the operator console 330 allows an operator to input particular number of cycles to utilize when blending the various products.

Figure 4:
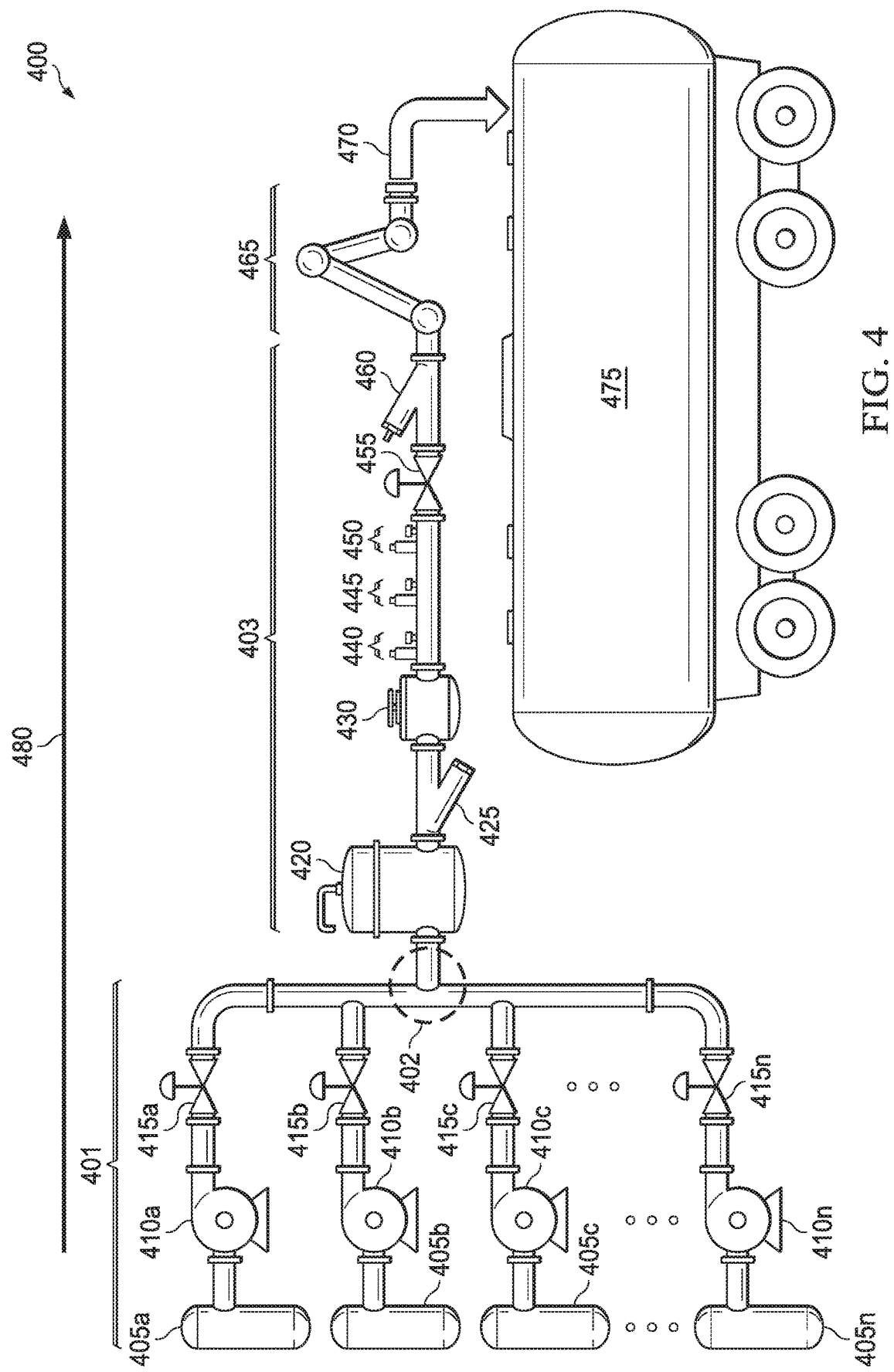
FIG. 4 illustrates a schematic view of a blending system in accordance with embodiments of the present disclosure.

FIG. 4 illustrates a schematic view of a blending system 400 in accordance with embodiments of the present disclosure. The embodiment of the blending system 400 shown in FIG. 4 is for illustration only. Other embodiments can be used without departing from the scope of the present disclosure. The blending system 400 depicts blending environment for blending separate products in a round robin fashion into a destination container.

The blending system 400 includes three separate portions, a product storage portion 401, a transition portion 402, and a control portion piping 403. The storage portion 401 includes the various products that can be combined to create a blended product. The transition portion 402 illustrates that each product transitions into a single pipe and utilize the same components of the control portion piping 403. The control portion piping 403 controls the flow of each product prior to the product entering the destination container.

The storage portion 401 includes a number of source containers such as tanks 405a, 405b, 405c through 405n (collectively referred to as tanks 405a-n), pumps 410a, 410b, 410c, through 410n (collectively referred to as pumps 410a-n), and block valves 415a, 415b, 415c through 415n (collectively referred to as block valves 415a-n), all interconnected by pipes.

Each of the tanks 405a-n stores a single product that can be utilized in the blending of the fuel products. For example, the tank 405a can store 87 octane fuel, the tank 405b can store diesel fuel, the tank 405c can store ethanol, other tanks represented by The tank 405n can store bio diesel, various alcohols (such as methanol, isopropyl alcohol), various ethers, stabilizers, dyes, nitromethane, acetone, butyl rubber, as well as other fuel products to minimize emissions and improve the functioning of an engine that will eventually burn the blended product (such as a gasoline stabilizer, octane boosters, fuel injector cleaners, fuel line antifreeze, anti-gelling components, and the like), to name a few.

Each of the tanks 405a-n are coupled to a singular pump such as the pumps 410a-n. The pumps 410a-n are similar to the pump 312 of FIG. 3. Each pump is coupled to a specific tank. For example, the pump 410a is coupled to the tank 405a, the pump 410b is coupled to the tank 405b, the pump 410c is coupled to the tank 405c, and the pump 410n is coupled to the tank 405n. Each pump is activated or deactivated based on a received command from the blending engine 326 of FIG. 3. For example, the blending engine 326 can transmit a signal instructing the pump 410a to activate. When the pump 410a receives the signal to activate from the blending engine 326, the pump 410a commences pumping a product that is stored in the tank 405a through the pipe and towards the block valve 415a.

The block valves 415a-n represents a type of valve that is capable of either prevent or allow the flow of a product. For example, the block valves 415a-n can completely stop the flow of fluid when in a closed position and allow fluid to flow unrestricted with opened. In certain embodiments, each block valve 415a-n is either a gate valve or a pinch valve. The block valve, such as the block valve 415a, when opened allows a product to flow from the tank 405a towards the transition portion 402. When the block valve is closed, it prevents fluids from flowing back towards a tank. For example, when the pump 410b is moving product from the tank 405b towards the transition portion 402, the block valve 415a, 415c, and 415n are closed to prevent any portion of the product from the tank 405b from contaminating the products in each of the respective tanks.

The transition portion 402 is a location where piping from each respective tank is combined as the products enters the control portion piping 403. For example, each product (stored in any of the tanks 405a-n) has its own pump (such as any of the pumps 410a-n) and block valve (such as any of the block valves 415a-n). All of the products that are stored in the tank 405a-n share the components within the control portion piping 403. The control portion piping 403 includes an air eliminator 420, a strainer 425, a flow meter 430 (similar to the flow meter 314 of FIG. 3), a temperature sensor 440, a pressure sensor 445, a density sensor 450 (collectively similar to the sensor 316 of FIG. 3), a control valve 455 (similar to the control valve 318 of FIG. 3), a check valve 460, and a dispensing arm 465.

The air eliminator 420 removes air within the system, the strainer 425 collects contaminates, the flow meter 430 derives the flow the product, the temperature sensor 440 measures the temperature of the product, the pressure sensor 445 measures the pressure of the product, the density sensor 450 measures the density of the product, the control valve 455 opens or closes to control the flow of the product as the product leaves the control portion piping 403, and the check valve 460 prevents fluid from flowing backwards in the system. It is noted that arrow 480 indicates the direction of the flow of each product. The respective product then enters the dispensing arm 465, which dispenses the product, illustrated by arrow 470, into a destination container such as a tanker truck 475. Other components can be added or removed without departing from the scope of the present disclosure.

In certain embodiments, the blending engine 326 receives an input for a particular blend. The blending engine 326 then instructs the first pump, such as the pump 410a, to engage and start pumping product stored in the tank 405a towards the dispensing arm 465. The block valve 415a is in the open position. In certain embodiments, the block valves 415b, 415c through 415n are in the closed position. For example, the blending engine 326 instructs the block valves 415b, 415c through 415n to close. In another example, the block valves 415b, 415c through 415n are manually closed. The product stored in the tank 405a is pumped towards the transition portion 402 and the flow is measured by the flow meter 430. The temperature, pressure, and density of the product are measured by the temperature sensor 440, the pressure sensor 445, and the density sensor 450. The readings from the flow meter 430, the temperature sensor 440, the pressure sensor 445 and the density sensor 450 are transmitted to the blending engine 326. Based on the flow of the product, the physical characteristics of the product as measured by the various sensors, and the meter factor 324 (that adjusts the measured reading of the flow meter 430), the blending engine 326 adjusts the control valve 455 to permit the product to flow pass and into the dispensing arm 465. The dispensing arm can have a load profile that is unique to each dispensing arm 465. For example, each dispensing arm has a unique flow profile when loading products into a destination container, such as the tanker truck 475. When loading occurs, the flow can start slow, then ramp up to a maximum flow rate limited by the dispensing arm, and towards the end of the loading, the flow slows down. A load profile of the dispensing arm 465 can be included in the information repository 322 of FIG. 3 and is used by the blending engine 326 when controlling the control valve 455. For example, the blending engine 326 can adjust the control valve 455 to increase or decrease the flow of the product based on the load profile for each dispensing arm, such as the dispensing arm 465.

When a certain portion of the product from the tank 405a is transferred to the tanker truck 475, the blending engine 326 instructs the pump 410a to stop pumping. After a line-up time, the blending engine 326 instructs the second pump, such as the pump 410b, to engage and start pumping product stored in the tank 405b towards the dispensing arm 465. The line-up time is discussed in greater detail below with respect to FIG. 5A. The block valve 415b is in the open position. In certain embodiments, the block valves 415a and 415c through 415n are in the closed position. The product stored in the tank 405b is pumped towards the transition portion 402 and the flow is measured by the flow meter 430. Thereafter the temperature, pressure, and density of the product are measured by the temperature sensor 440, the pressure sensor 445, and the density sensor 450. Based on the flow of the product, the physical characteristics of the product as measured by the various sensors, and the meter factor 324 (that adjusts the measured reading of the flow meter 430), the blending engine 326 adjusts the control valve 455 to permit the product to flow pass and into the dispensing arm 465 to be deposited into the tanker truck 475.

When a certain portion of the product from the tank 405b is transferred to the tanker truck 475, the blending engine 326 instructs the pump 410b to stop pumping. After a line-up time, the blending engine 326 instructs the third pump, such as the pump 410c, to engage and start pumping product stored in the tank 405c towards the dispensing arm 465. The block valve 415c is in the open position. In certain embodiments, the block valves 415a, 415b through 415n are in the closed position. The product stored in the tank 405c is pumped towards the transition portion 402 and the flow is measured by the flow meter 430. Thereafter the temperature, pressure, and density of the product are measured by the temperature sensor 440, the pressure sensor 445, and the density sensor 450. Based on the flow of the product, the physical characteristics of the product as measured by the various sensors, and the meter factor 324 (that adjusts the measured reading of the flow meter 430), the blending engine 326 adjusts the control valve 455 to permit the product to flow into the dispensing arm 465 to be deposited into the tanker truck 475.

When the blend product includes only three products, a single cycle is completed when the product from the tank 405c is transferred to the tanker truck 475. Thereafter the process repeats starting with the product stored in the tank 405a. Each cycle or product from the tank 405a, 405b, and then 405c is repeated until a preset volume is received in the tanker truck 475.

The product that is delivered last in each cycle is the product is considered the main product. For example, if there are two products in a blend product, the product with the larger volume is the main product. The product with the smaller volume is the component product and delivered in each cycle first, and the main product is delivered in each cycle last. In another example, if there are three products in a blend product, the product with the largest volume is the main product. The products with the smaller volume are the component products. In certain embodiments, the component product with the smaller volume is delivered first, followed by the component product with the larger volume, and then the main product is delivered last in each cycle. As such, regarding the last example, product stored in the tank 405c is the main product, and the products stored in the tanks 405a and 405b are the component products. The component product stored in the tank 405b is a larger percentage of the blended product than the component product stored in the tank 405a. The main product is delivered last.

In certain embodiments, the tanker truck 475 can have multiple compartments. If the tanker truck 475 has multiple compartments, the completion of the previous example completes a single batch. If the tanker truck 475 has multiple compartments, each compartment can include different blends, such as different blend ratios or different blend products. If the tanker truck 475 has a single compartment, the completion of the previous example completes a transaction.

FIGS. 5A and 5B illustrates an example of two products blending in accordance with embodiments of the present disclosure. FIG. 5C illustrates an example of three products blending in accordance with embodiments of the present disclosure. The embodiment of the blending products shown in the environment 500a, 500b, and 500c are for illustration only. Other embodiments can be used without departing from the scope of the present disclosure. The environments 500a, 500b, and 500c provide a pictorial depiction of blending separate products in a round robin fashion into a destination container according to embodiments of this disclosure.

Referring to FIGS. 5A and 5B, blocks 502, 502a, 506, 506a, 510, 510a, 514, and 514a, illustrate the transfer of a single product P2. For example, product P2 can be any product stored in a tank, such as the tanks 405a-n of FIG. 4. Product P2 is the component product. Similarly, blocks 504, 504a, 508, 508a, 512, 512a, 516, and 516a, illustrate the transfer of a single product P1. For example, product P1 can be any product stored in a tank, such as the tanks 405a-n of FIG. 4.

As illustrated in the environment 500a, product P2 at block 502 is first transferred from the storage tank to the destination container. Thereafter product P1 at block 504 is transfer the storage tank to the destination container. A single cycle is complete when products P2 at block the 502 and P1 at block 504 are transferred to the destination container. The process continues and again product P2 at block 506 is transferred to the destination container followed by product P1 at block 508, completing the second cycle. The process continues and again product P2 at block 510 is transferred to the destination container followed by product P1 at block 512, completing the third cycle. The process continues and again product P2 at block 514 is transferred to the destination container followed by product P1 at block 516, completing the fourth cycle. Upon completing the fourth cycle, the total volume of the product is added to the destination container completing a single batch.

The line-up time 515 is the interval of time that is required to switch between each product, that of product P1 and product P2. For example, when product P2 at block 502 is complete the line-up time 515 is the time between the completion of product P2 at block 502 and the start of product P1 at block 504. In certain embodiments, the line-up time 515 is configurable between each product change out. For example, the blending engine 326 of FIG. 3 controls the quantity of time between turning off the pump associated with the current product being delivered and engaging the pump associated with next product. In certain embodiments, the line-up time 515 is a timer, and when the timer commences, the pump associated with the current product being delivered is stopped and when the timer expires the pump associated with next product is engaged. In certain embodiments, the line-up time changes between each product, changes between each cycle, or remains constant between each product.

The environment 500b illustrates a graphical representation of the products P1 and P2 (as illustrated in the environment 500a) being transferred into the destination container. The flowrate 520 is the rate of flow of the product as measured by the flow meter 314 of FIG. 3 and the flow meter 430 of FIG. 4. Product P1 has a higher flow rate than that of the product P2. Additionally, the volume or quantity 530 of the product P1 is larger than the volume of the product P2 that is transferred to the destinations container.

The graphed flowrate 520 to quantity 530 of each product illustrates the load profile of each product. For example, with respect to P1 at blocks 504a, 508a, 512a, and 516a the flow starts slow as depicted by the shallow slope of the line. The flow quickens as depicted by the steeper slope. The flow reaches a maximum flow rate, which can be dependent on the pump that is pumping the fluid P1, a configurable maximum flow rate parameter, and the like. In another example, with respect to P2 at blocks 502a, 506a, 510a, and 514a, a smaller percentage is transferred to the destination container. The flow starts of slow, reaches a maximum flowrate, and then slowly reduces to zero.

With respect to the environment 500a and the environment 500b, the following example illustrates the process of blending two products. For example, the blending engine 326 of FIG. 3 can receive a set of inputs for filling one compartment of a destination container. The set of instructions include the size of the compartment, an input including two products to blend (or a trade name of a blended product), and a ratio of each product that is to be blended. In certain embodiments, the blending engine 326 also receives the number of blend cycles which indicates the blend percentage that is in each blend cycle. In certain embodiments, the blending engine 326 identifies the number of blend cycles necessary to provide a homogeneous mixture. If the blending engine 326 receives a trade name of a product to blend, the blending engine 326 looks up the trade name to identify the components of the blend product via the information repository 322. The blending engine 326 identifies and receives the products P1 and P2 for the blend product, the preset quantity of the blended products is 4,000 liters (L), a blend ratio of 20% (where P1 is the main product and P2 is the component product) and a blend percentage of 25% (or 4 cycles). The blending engine 326 then derives the total blend product to the blend ratio, such that 20% of the product is P2 and 80% of the product is P1 which yields 3,200 L of P1 and 800 L of P2. The blending engine 326 determines that 4 cycles are to be utilized to create a homogeneous mixture of the specific products, P1 and P2. Each cycle will transfer a quarter of the total volume yielding, 800 L of P1 and 200 L of P2 during each of the four cycles. At block 502 (and 502A) the blending engine 326 controls the pump of product P2 and the control valve to deliver 200 L of P2. Thereafter at block 504 (and 504*a*) the blending engine 326 controls the pump of product P1 and the control valve to deliver 800 L of P1, thereby completing a single cycle. Following the completion of the first cycle, 1,000 L are blended within the destination container. Thereafter, at block 506 (and 506A) the blending engine 326 controls the pump of product P2 and the control valve to deliver 200 L of P2. Thereafter at block 508 (and 508*a*) the blending engine 326 controls the pump of product P1 and the control valve to deliver 800 L of P1, thereby completing a second cycle. Following the completion of the second cycle, 2,000 L are blended within the destination container. Thereafter, at block 510 (and 510A) the blending engine 326 controls the pump of product P2 and the control valve to deliver 200 L of P2. Thereafter, at block 512 (and 512*a*) the blending engine 326 controls the pump of product P1 and the control valve to deliver 800 L of P1, thereby completing a third cycle. Following the completion of the third cycle, 3,000 L are blended within the destination container. Thereafter, at block 514 (and 514A) the blending engine 326 controls the pump of product P2 and the control valve to deliver 200 L of P2. Thereafter, at block 516 (and 516*a*) the blending engine 326 controls the pump of product P1 and the control valve to deliver 800 L of P1, thereby completing a fourth cycle. Upon the completion of the fourth cycle, the destination container received 4,000 L.

With reference to the environment 500*c* of FIG. 5C, the blending of three products is illustrated. Blocks 554, 560, 566, and 572 illustrate the transfer of the main product P1. Blocks 552, 558, 564, and 570 illustrate the transfer of a single product P2. Product P2 is neither the main product nor the smallest product. Blocks 550, 556, 562, 568, illustrate the transfer of a single product P3. Product P3 is the smallest component product. Line-up time 580 similar to line-up time 515 of FIG. 5A.

The line-up time 580 is the interval of time that is required to switch between each product, that of product P1, product P2, and product P3. In certain embodiments, the line up time 580 is uniform between the switching of products P3 to P2, P2 to P1, and P1 to P3. That is, the same amount of time is required to switch between each product. In certain embodiments a different amount of time is needed to switch between products. For example, to switch between products P3 to P2 a first amount of time transpires, to switch between products P2 to P1 a second amount of time transpires, and to switch between products P1 to P3 a third amount of time transpires. In certain embodiments the amount of time used by the line up time 580 is not uniform between each product. In certain embodiments, the line-up time 580 is configurable between each product change out. For example, the blending engine 326 of FIG. 3 controls the quantity of time between turning off the pump associated with the current product being delivered and engaging the pump associated with next product. In certain embodiments, the line-up time 580 is a timer, and when the timer commences, the pump of associated with the current product being delivered is stopped and when the timer expires the pump associated with next product is engaged.

The following example illustrates the process of blending three products. The blending engine 326 of FIG. 3 can receive a set of inputs for filling one compartment of a destination container. The set of instructions include the size of the compartment, an input including three products to be blended (or a trade name of a blended product), and a ratio of each product that is to be blended. The blending engine 326 identifies the products P1, P2, and P3 as the component products, the preset quantity of the blended products is 4,000 liters (L), the main product P1 ratio is 70%, the component product P2 ratio is 20% and the component product P3 ratio is 10%. The blending engine 326 either derives the number of cycles to produce a homogeneous mixture or receives an input as to the number of cycles. The blending engine 326 then derives the total volume of each independent product needed to create the blend product. For example, 70% of 4,000 L is 2,800 L of P1, 20% of 4,000 L is 800 L of P2, and 10% of 4,000 L is 400 L of P3. If four cycles are used to create the blend product, then 100 L of P3, 200 L of P2 and 700 L of P1 are delivered individually in each cycle.

At block 550 the blending engine 326 instructs the pump of product P3 to start pumping and the control valve to regulate and to deliver 100 L of P3, based on received information from the sensor and the flow rate meter. When the 100 L of P3 is transferred, the blending engine 326, instructs the pump of product P3 to stop pumping. At block 552 the blending engine 326 instructs the pump of product P2 to start pumping. At block 552 the blending engine 326 also regulates the control valve to deliver 200 L of P2, based on received information from the sensor and the flow rate meter. When the 200 L of P2 is transferred, the blending engine 326 instructs the pump of product P2 to stop pumping. At block 554, the blending engine 326 instructs the pump of product P1 to start pumping. At block 554, the blending engine 326 also regulates the control valve to deliver 700 L of P1, based on received information from the sensor and the flow rate meter thereby completing the first cycle. When the 700 L of P1 is transferred, the blending engine 326, instructs the pump of product P1 to stop pumping. Following the completion of the first cycle 1,000 L are blended within the destination container.

At block 556 the blending engine 326 instructs the pump of product P3 to start pumping. At block 556 the blending engine 326 also regulates the control valve to deliver 100 L of P3, based on received information from the sensor and the flow rate meter. When the 100 L of P3 is transferred, the blending engine 326, instructs the pump of product P3 to stop pumping. At block 558 the blending engine 326 instructs the pump of product P2 to start pumping. At block 558 the blending engine 326 also regulates the control valve to deliver 200 L of P2, based on received information from the sensor and the flow rate meter. When the 200 L of P2 is transferred, the blending engine 326, instructs the pump of product P2 to stop pumping. At block 560, the blending engine 326 instructs the pump of product P1 to start pumping. At block 560 the blending engine 326 also regulates the control valve to deliver 700 L of P1, based on received information from the sensor and the flow rate meter thereby completing the second cycle. When the 700 L of P1 is transferred, the blending engine 326 instructs the pump of product P1 to stop pumping. Following the completion of the second cycle, 2,000 L are blended within the destination container.

At block 562 the blending engine 326 instructs the pump of product P3 to start pumping. At block 562 the blending engine 326 also regulates the control valve to deliver 100 L of P3, based on received information from the sensor and the flow rate meter. When the 100 L of P3 is transferred, the blending engine 326 instructs the pump of product P3 to stop pumping. At block 564 the blending engine 326 instructs the pump of product P2 to start pumping. At block 564 the blending engine 326 also regulates the control valve to deliver 200 L of P2, based on received information from the sensor and the flow rate meter. When the 200 L of P2 is transferred, the blending engine 326 instructs the pump of product P2 to stop pumping. At block 566, the blending engine 326 instructs the pump of product P1 to start pumping. At block 566 the blending engine 326 also regulates the control valve to deliver 700 L of P1, based on received information from the sensor and the flow rate meter thereby completing the third cycle. When the 700 L of P1 is transferred, the blending engine 326 instructs the pump of product P1 to stop pumping. Following the completion of the third cycle 3,000 L are blended within the destination container.

At block 568 the blending engine 326 instructs the pump of product P3 to start pumping. At block 568 the blending engine 326 also regulates the control valve to deliver 100 L of P3, based on received information from the sensor and the flow rate meter. When the 100 L of P3 is transferred, the blending engine 326 instructs the pump of product P3 to stop pumping. At block 570 the blending engine 326 instructs the pump of product P2 to start pumping. At block 570 the blending engine 326 also regulates the control valve to deliver 200 L of P2, based on received information from the sensor and the flow rate meter. When the 200 L of P2 is transferred, the blending engine 326 instructs the pump of product P2 to stop pumping. At block 572, the blending engine 326 instructs the pump of product P1 to start pumping. At block 572 the blending engine 326 also regulates the control valve to deliver 700 L of P1, based on received information from the sensor and the flow rate meter thereby completing the third cycle. When the 700 L of P1 is transferred, the blending engine 326, instructs the pump of product P1 to stop pumping. Upon the completion of the fourth cycle the destination container received 4,000 L.

Figure 6:
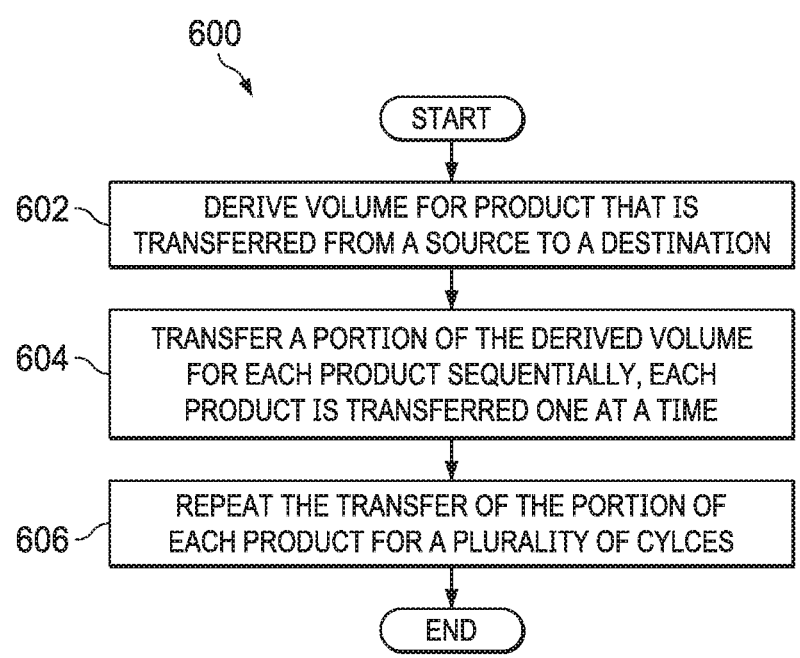
FIG. 6 illustrates a method for a fuel blending in accordance with embodiments of the present disclosure.

FIG. 6 illustrates a method 600 for fuel blending in accordance with embodiments of the present disclosure. The steps in FIG. 6 can be performed by the server 320, the blending engine 326, or the operator console 330 as shown in FIG. 3. The steps in FIG. 6 can be performed by server 116 as shown in FIG. 1.

As shown in the method 600, at step 602 the blending engine 326 derives a volume of each product from at least two products. In certain embodiments, the derived volume is the total volume of each product that is transferred from separate source containers to fill a destination container. For example, the derived volume is based on the total to be transferred to the destination container. In another example, the derived volume is based on the individual percentages of each component product that make up the blend product. In certain embodiments, the derived volume of each product includes a larger product, known as a main product, and at least one smaller product, known as one or more component products.

At step 604 the blending engine 326 transfers a portion of each product sequentially. Each product is transferred one at a time, with the largest product by volume being transferred last. In certain embodiments, a portion of each product is transferred. In certain embodiments, a flow rate meter measures each product, as each product is transfer from its source container to the destination container. The blending engine 326 can adjust a valve, such as a control valve, that regulates the transfer of each of the at least two products that enter the destination container based on the measured flow rate. The blending engine 326 can also sequentially activate and deactivate individual pumps that are associated with each product. The pumps perform the transfer of each product individually to the destination container. In certain embodiments, only one pump is activated at a time, such a single product is transferred at a time. In certain embodiments, the blending engine 326 can manipulate and adjust a received reading from a flow meter that measures the flow of each product. For example, the flow meter indicates the volume of each product that is being transferred. Each of the products can have different attributes such as viscosity, density temperature, pressure, and the like, which can affect the reading of the flow meter. For example, density, temperature, and pressure are readings that are used to convert the observed volume via the flow meter 314 to a standard volume. By adjusting the received reading of the flow meter, based on physical attributes of the product being transferred, the blending engine 326 can derive the actual volume of the product being transferred. In certain embodiments, a load profile of the dispensing arm can alter the volume of each product that is transferred. In certain embodiments the load profile is maintained with respect to the target flowrate, as the load profile is configurable. For example, the load profile can match the target flowrate of the blending engine 326.

In certain embodiments, while sequentially transferring each product one at a time, the blending engine can wait for a line-up timer to end. When the line-up timer ends, the blending engine 326 begins the transfer of one product by activating a pump. The transferring of one product ends when a target volume of the portion of the one product is transferred to the destination container. The line-up time begins when the transfer of the one product ends.

In certain embodiments, transferring a portion of each product one at a time also includes activating a first pump that is associated with the first product of the at least two products. The first pump transfers the portion of the first product to the destination container. When a portion of the derived volume of first product is reached, the first pump is deactivated. A sequential pump that is associated with another product of the at least two products is activated and transfers a portion of the other product to the destination container.

In certain embodiments, to transfer the portion of each of the products into the destination container includes two sets of equipment. The first set of equipment includes a storage tank, a pump, and a block valve. Each product includes its own first set of equipment. The second set of equipment includes a control valve, a flow meter, and a set of sensors. Each product shares the second set of equipment.

At step 606 the blending engine 326 repeats the transfer of the portion of each product in a plurality of cycles. For example, the process is repeated until the derived volume of each of the products is transferred into the destination container. In certain embodiments, the blending engine 326 identifying a number of cycles to generate a homogeneous blend of each of the products based on identified properties of each product. In certain embodiments, the blending engine 326 derives the volume of each portion that is transferred based on the identified number of cycles.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for fuel blending, the method comprising:
deriving a volume of each product from at least two products that are transferred from separate source containers to fill a destination container;
transferring a portion of the derived volume of each of the products using a shared single control valve, a shared single flow meter, and a shared single set of sensors, sequentially into the destination container, wherein each product is transferred one at a time; and
repeating the transfer of the portion of each of the products for a plurality of cycles until the derived volume of each of the products is transferred into the destination container,
wherein each product of at least two products is transferred individually and sequentially during each of the cycles, and
wherein the portion of the derived volume is based on the plurality of cycles.

2. The method of claim 1, further comprising:
receiving a flow rate of each product from a flow meter as each product is transferred from the separate source containers to the destination container;
adjusting a valve that regulates the transfer of each of the at least two products that enter the destination container based on the received flow rate; and
sequentially activating and deactivating at least two pumps, to transfer each of the products from the separate source containers to the destination container, wherein each pump is associated with one product of the at least two products.

3. The method of claim 1, wherein to transfer the portion of each of the products to the destination container, the method further comprises:
receiving a reading from a flow meter; and
adjusting the received reading based on identified properties each of the of each of the products.

4. The method of claim 1, wherein transferring each of the products sequentially into the destination container comprises:
waiting for a line-up timer to end;
beginning the transfer of one product by activating a pump in response to the line-up timer ending;
ending the transfer of the one product by deactivating the pump when a target volume of the portion of the one product is transferred to the destination container; and
beginning the line-up timer when the transfer of the one product ends.

5. The method of claim 1, further comprising:
identifying one product of the at least two products that is a larger percentage than other products of the at least two products,
wherein to transfer the portion of each of the products sequentially into the destination container comprises transferring the portion of the one product after transferring the portion of the other products.

6. The method of claim 1, wherein the at least two products include a first product, the method further comprising:
activating a first pump that is associated with the first product of the at least two products, the first pump configured to transfer the portion of the first product to the destination container; and
when the portion of the first product is reached during a first cycle, deactivating the first pump and activating a sequential pump that is associated with another product of the at least two products to transfer a portion of the other product to the destination container, until the derived volume of each of the at least two products is transferred.

7. The method of claim 1, wherein the derived volume of each of the at least two products is based on a percentage of each product; and
wherein the method further comprises identifying a number of cycles to generate a homogeneous blend of each of the products based on identified properties of each product.

8. The method of claim 1, further comprising:
using a first set of equipment and a second set of equipment to transfer the products into the destination container, wherein first set of equipment includes a storage tank, a pump, the shared single control valve, the shared single flow meter, and the shared single set of sensors, and a block valve, and the second set of equipment includes a second shared single control valve, a second shared single flow meter, and a second shared single set of sensors, and wherein each of the products transferred to the destination container utilize separate sets of the first set of equipment and share the second set of equipment.

9. An apparatus comprising:
a set of industrial equipment operably able to transfer at least two products from separate source containers to fill a destination container;
an interface; and
a processor operably connected to the interface and the set of industrial equipment, wherein the processor is configured to:
derive a volume of each product from the at least two products that are transferred from the separate source containers to fill the destination container,
instruct the set of industrial equipment to transfer a portion of the derived volume of each of the products using a shared single control valve, a shared single flow meter, and a shared single set of sensors, sequentially into the destination container, wherein each product is transferred one at a time, and
instruct the set of industrial equipment to repeat the transfer of the portion of each of the products for a plurality of cycles until the derived volume of each of the products is transferred into the destination container,
where each product of at least two products is transferred individually and sequentially during each of the cycles, and
wherein the portion of the derived volume is based on the plurality of cycles.

10. The apparatus of claim 9, wherein:
the set of industrial equipment further includes at least two pumps, and
the processor is further configured to:
receive, from the shared single flow meter, a flow rate of each product as each product is transferred from the separate source containers to the destination container;
adjust the shared single control valve that regulates the transfer of each of the at least two products that enter the destination container based on the received flow rate; and
sequentially activate and deactivate the at least two pumps that transfer each of the products from the separate source containers to the destination container, wherein each pump is associated with one product of the at least two products.

11. The apparatus of claim 9, wherein to transfer the portion of each of the products to the destination container, the processor is further configured to:
receive a reading from the shared single flow meter; and
adjust the received reading based on identified properties each of the of each of the products.

12. The apparatus of claim 9, wherein to transfer each of the products sequentially into the destination container, the processor is further configured to:
wait for a line-up timer to end;
begin the transfer of one product by activating a pump in response to the line-up timer ending;
end the transfer of the one product by deactivating the pump when a target volume of the portion of the one product is transferred to the destination container; and
begin the line-up timer when the transfer of the one product ends.

13. The apparatus of claim 9, wherein:
the processor is further configured to identify one product of the at least two products that is a larger percentage than other products of the at least two products; and
to transfer the portion of each of the products sequentially into the destination container, the processor is configured to instruct the set of industrial equipment to transfer the portion of the one product after transferring the portion of the other products.

14. The apparatus of claim 9, wherein:
the at least two products include a first product; and
the processor is further configured to:
activate a first pump that is associated with the first product of the at least two products, the first pump configured to transfer the portion of the first product to the destination container; and
when the portion of the first product is reached during a first cycle, deactivate the first pump and activate a sequential pump that is associated with another product of the at least two products to transfer a portion of the other product to the destination container, until the derived volume of each of the at least two products is transferred.

15. The apparatus of claim 9, wherein:
the derived volume of each of the at least two products is based on a percentage of each product; and
the processor is further configured to identify a number of cycles to generate a homogeneous blend of each of the products based on identified properties of each product.

16. The apparatus of claim 9, wherein the set of industrial equipment comprises:
a first set of equipment that includes a storage tank, a pump, the shared single control valve, the shared single flow meter, and the shared single set of sensors, and a block valve; and
a second set of equipment that includes a second shared single control valve, a second shared single flow meter, and a second shared single set of sensors,
wherein each of the products utilizes a separate set of the first set of equipment and the products share the second set of equipment.

17. A non-transitory computer readable medium embodying a computer program, the computer program comprising computer readable program code that when executed by a processor of an electronic device causes the processor to:
derive a volume of each product from at least two products that is transferred from separate source containers to fill a destination container;
transfer a portion of the derived volume of each of the products sequentially using a shared single control valve, a shared single flow meter, and a shared single set of sensors into the destination container, wherein each product is transferred one at a time; and
repeat the transfer of the portion of each of the products for a plurality of cycles until the derived volume of each of the products is transferred into the destination container,
wherein each product of at least two products is transferred individually and sequentially during each of the cycles, and
wherein the portion of the derived volume is based on the plurality of cycles.

18. The non-transitory computer readable medium of claim 17, wherein the computer readable medium further comprising program code that, when executed at the processor, causes the processor to:

receive a flow rate of each product as each product is transferred from the separate source containers to the destination container;

adjust a valve that regulates the transfer of each of the at least two products that enter the destination container based on the received flow rate; and sequentially activate and deactivate at least two pumps, to transfer each of the products from the separate source containers to the destination container, wherein each pump is associated with one product of the at least two products.

19. The non-transitory computer readable medium of claim 17, wherein the computer readable medium further comprising program code that, when executed at the processor, causes the processor to:

activate a first pump that is associated with a first product of the at least two products, the first pump configured to transfer the portion of the first product to the destination container; and when the portion of the first product is reached during a first cycle, deactivate the first pump and activate a sequential pump that is associated with another product of the at least two products to transfer a portion of the other product to the destination container, until the derived volume of each of the at least two products is transferred.

20. The non-transitory computer readable medium of claim 17, wherein the derived volume of each of the at least two products is based on a percentage of each product; and wherein the computer readable medium further comprising program code that, when executed at the processor, causes the processor to identify a number of cycles to generate a homogeneous blend of each of the products based on identified properties of each product.

* * * * *